J. L. McKNIGHT.
Grain Mill.

No. 3,373.

Patented Dec. 5, 1843.

UNITED STATES PATENT OFFICE.

JAMES L. McKNIGHT, OF BUCHANAN, VIRGINIA.

IMPROVEMENT IN CORN AND COB CRUSHER.

Specification forming part of Letters Patent No. 3,373, dated December 15, 1843; antedated December 2, 1843.

*To all whom it may concern:*

Be it known that I, JAMES L. MCKNIGHT, of Buchanan, in the county of Botetourt and State of Virginia, have invented a new and useful Machine for Crushing and Grinding Corn and Cobs and Hulling Clover-Seed; and I do hereby declare that the following is a full, clear, and exact description thereof, reference being had to the accompanying drawings, which form a part of this specification.

Figure 1:
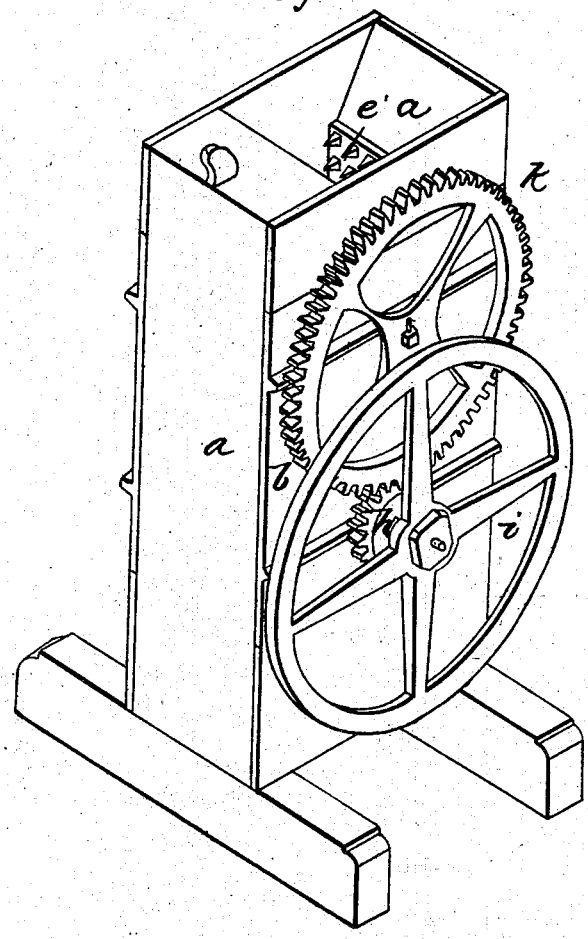
Figure 2:
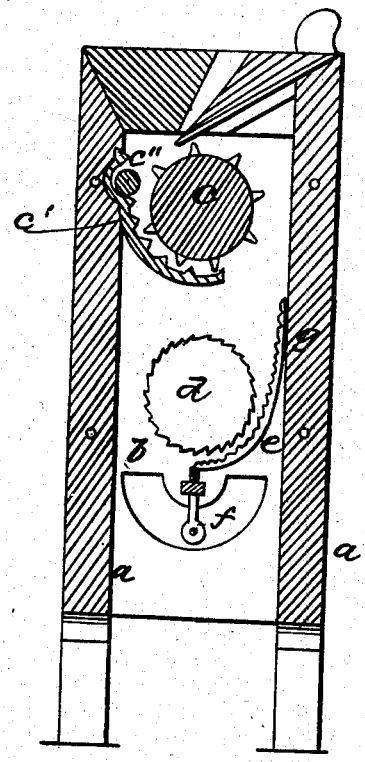
Figure 3:
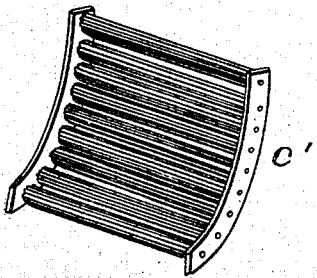

Figure 1 is an isometrical view; Fig. 2, a vertical section; Fig. 3, lower concave detached.

The nature of my invention consists in placing two cylinders in a frame, one above another and run in opposite directions, each being furnished with a concave, but placed on opposite sides.

The frame of my machine is composed of two uprights, $a$, wide enough to form the ends, to the sides of which cast-iron plates $b$ are bolted, that inclose the sides from the top of the upper cylinder down below the lower concave. The cylinders have their bearings in said plates $b$, and the concaves are also supported between them. The upper cylinder, $c$, is surrounded with pyramidal-shaped teeth set spirally around it, and the concave $c'$ is armed with similar teeth set in rows, between which those on the cylinder pass. The upper edge of the concave is set a sufficient distance from the cylinder to admit the corn between them, and gradually approaches the surface of the cylinder to its termination, which is a little beyond the center. This concave is firmly fixed in its place and has a roller, $c''$, in it at its mouth, which causes it to feed better. Directly below this the second cylinder, $d$, is put, the concave $e$ to which is similarly shaped, (fluted rollers $e'$ may be put in the concave instead of the grooves, see Fig. 3,) placed on the side opposite to that above it. This receives from the upper one the broken corn, and the process of grinding is completed between them. The lower cylinder and concave have their grinding-surface covered with serrated or triangular grooves instead of the teeth on the upper ones.

The concave $e$, instead of being stationary, rests below on two set-screws, $f$, by which it can be raised or lowered. A wedge, $g$, is also placed behind its upper edge, which will move it in or out, as required, by slipping it up or down. Onto one journal of the lower cylinder a common pulley is put outside of the frame, and not shown in the drawings, by which it is connected with the driving-power. On the other journal there is a pinion, $h$, and a balance-wheel, $i$, may be also added. On the journal of the upper cylinder a spur-wheel, $k$, is fixed, which works into the pinion $h$ below. By this gearing the lower cylinder is made to run much faster than the one above and in an opposite direction. A hopper is framed in the frame above the upper concave to direct the corn, &c., into it.

I contemplate using this machine for hulling clover-seed and getting it out, as well as grinding corn, which it effectually accomplishes.

By the above mode of construction my machine is rendered compact and portable, and by reversing the motion of the cylinders I am enabled to gear them with one spur-wheel and one pinion.

What I claim as my invention, and desire to secure by Letters Patent, is—

The manner in which I have combined the upper cylinder and its concave with the lower cylinder and its concave, the said parts being arranged and constructed substantially as set forth in the above specification.

JAMES L. McKNIGHT.

Witnesses:
J. J. GREENOUGH,
CHS. H. VAN DORN.